United States Patent [19]

Fehér et al.

[11] Patent Number: 4,749,914

[45] Date of Patent: Jun. 7, 1988

[54] CIRCUIT SYSTEM FOR IGNITING AND OPERATING A HIGH-PRESSURE DISCHARGE LAMP, PARTICULARLY A SODIUM VAPOR LAMP

[75] Inventors: Zoltán Fehér; Árpád Kárpát; János Melis; Rudolf Sirató ; András Szeverényi; Béla Waldinger, all of Budapest, Hungary

[73] Assignee: El-Co Villamos Keszulekek es Szerelesi Anyagok Gyara, Budapest, Hungary

[21] Appl. No.: 825,329

[22] Filed: Feb. 3, 1986

[30] Foreign Application Priority Data

Feb. 7, 1985 [HU] Hungary ............................ 467/85
Jun. 25, 1985 [HU] Hungary ........................... 2482/85

[51] Int. Cl.⁴ .................... H05B 37/00; H05B 41/24; H05B 41/14
[52] U.S. Cl. .................... 315/246; 315/160; 315/174; 315/175; 315/176; 315/206; 315/209 R; 315/242; 315/243; 315/227 R; 315/DIG. 7; 315/308
[58] Field of Search ............... 315/241, 242, 243, 308, 315/206, 208, 209 R, 246, DIG. 2, DIG. 7, DIG. 5, 170, 172, 174, 175, 176, 177

[56] References Cited

U.S. PATENT DOCUMENTS

| | | | |
|---|---|---|---|
| 4,053,813 | 10/1977 | Kornrumpf et al. | 315/206 |
| 4,220,896 | 9/1980 | Paice . | |
| 4,329,627 | 5/1982 | Holmes | 315/209 R |
| 4,410,837 | 10/1983 | Suzuki et al. | 315/170 |
| 4,437,042 | 3/1984 | Morais et al. | 315/289 |
| 4,471,269 | 9/1984 | Ganser et al. | 315/DIG. 7 |
| 4,572,988 | 2/1986 | Handler et al. | 315/209 R |
| 4,572,990 | 2/1986 | Leale et al. | 315/220 |
| 4,587,460 | 5/1986 | Murayama et al. | 315/174 |
| 4,594,531 | 6/1986 | Ganser et al. | 315/DIG. 7 |
| 4,598,232 | 7/1986 | Nilssen | 315/225 |
| 4,612,478 | 9/1986 | Payne | 315/170 |

FOREIGN PATENT DOCUMENTS

| | | |
|---|---|---|
| 0066481 | 12/1982 | European Pat. Off. . |
| 0091724 | 10/1983 | European Pat. Off. . |
| 2705170 | 8/1977 | Fed. Rep. of Germany . |
| 2909605 | 9/1980 | Fed. Rep. of Germany . |
| 0335379 | 12/1958 | Switzerland ........................ 315/174 |
| 655000 | 7/1951 | United Kingdom . |
| 824906 | 12/1959 | United Kingdom . |
| 1254892 | 11/1971 | United Kingdom . |
| 2018062 | 10/1979 | United Kingdom . |
| 1556292 | 11/1979 | United Kingdom . |
| 2030388 | 4/1980 | United Kingdom ......... 315/DIG. 7 |
| 1570927 | 7/1980 | United Kingdom . |
| 1577520 | 10/1980 | United Kingdom . |
| 2074801 | 11/1981 | United Kingdom . |
| 1605073 | 12/1981 | United Kingdom . |
| 2088156 | 6/1982 | United Kingdom . |

OTHER PUBLICATIONS

Tungsramrt: "Operating High Pressure Sodium Lamps" (an Article published by the lamp manufacturer Tungsram in the Hungarian lang.).

Primary Examiner—David K. Moore
Assistant Examiner—Michael J. Nickerson
Attorney, Agent, or Firm—Handal & Morofsky

[57] ABSTRACT

A circuit system for igniting and lighting a high-pressure discharge lamp, particularly a sodium vapor lamp, comprising a pulse generator for generating signals of at least 1 kHz frequency being a high-frequency DC/AC converter connected to a direct current source and an ignition circuit coupled with the pulse generator including a high-pressure discharge lamp, a condenser connected in parallel to the high-pressure discharge lamp and an inductive member connected to the condenser and the high-pressure discharge lamp and forming a series member with the condenser the ignition circuit is provided with a transformer having a secondary winding connected in series with the inductive member for ensuring high reliability of igniting and for improving the conditions of lighting.

20 Claims, 4 Drawing Sheets

CIRCUIT SYSTEM FOR IGNITING AND OPERATING A HIGH-PRESSURE DISCHARGE LAMP, PARTICULARLY A SODIUM VAPOR LAMP

BACKGROUND OF THE INVENTION

The invention relates to a circuit system comprising a pulse generator constituting a high-frequency AC/DC converter and an ignition circuit including a high-pressure lamp. The proposed circuit system is applicable for igniting and operating a high-pressure discharge lamp, particularly a sodium vapour lamp and it can be produced on the basis of commonly used or easily disignable elements.

DESCRIPTION OF THE PRIOR ART

As it is known, the high-pressure discharge lamps and particularly the sodium vapour lamps comprising a gas filling require preheating and applying an ignition voltage of a higher voltage then their operating voltage drop. The lamps have negative current characteristics and therefore it is necessary to equip them with a circuit system wherein the current can be limited. Some problems of thermical art follow from the fact that the high-pressure discharge lamps can reach the nominal light output only after the determined preheating (lasting sometimes several minutes). The reliable ignition requires applying relatively high ignition voltage and this results in the higher electric load of the circuit elements and in easier deterioration.

The circuit systems applied for securing the operating conditions of a high-pressure discharge lamp are known in many different embodiments. According to the present practice the systems considered to be the most developed are ones which generate high-frequency voltage pulses preferably in resonance conditions because in this case the light efficiency can be increased by 10 to 15% in comparison to the other systems and the disturbing stroboscopic effects following the alternating changes of the network voltage can not be noticed.

The main requirements to be met by the circuit systems for light high-pressure discharge lamps are the small dimensions of the circuit system and the low level of electric losses. A further requirement concerns the number of the circuit elements which should be minimal in order to reduce the losses, however, high enough to ensure the operating conditions of the high-pressure discharge lamps determined by the manufacturers of the lamps.

The most important features, operating parameters of the high-pressure discharge lamps and the main requirements to be met by them are usually listed in the publications of the lamp manufacturers. A publication of this kind was published by the firm TUNGSRAM. The publications show in general circuit arrangements connected to the given types of the high-pressure discharge lamps. The most of them are supplied by a network of 50 Hz or 60 Hz frequency, because of taking into account mainly the public networks as an energy source for the high-pressure discharge lamp. When selecting the operating point of a high-pressure discharge tube and determining the operating conditions of the discharge lamp up to the present the skilled artisan has determined the operating voltage drop of the discharge lamp slightly higher than the half of the supply (network) voltage. The operating voltage drop should be, however, over this limit. The operating point of the discharge tube slides along the characteristics during the process of ageing of the discharge tube. This change in the operating point can not be avoided because of the slowly increasing operating voltage drop of the lamp with the operating life used up.

It is also known that the high-voltage discharge lamps of a lower supply voltage and therefore having a by lower operating voltage drop e.g. in the range of about 50 V are characterized by a longer life duration then the lamps with a higher operating voltage drop. This means, the high-pressure discharge lamps having a 50 V operating voltage drop connected to a network having approximately a 110 V voltage have in average longer life duration than the lamps coupled with a network of about 220 V voltage and having an operating voltage drop of about 100 to 120 V. The first mentioned lamps also require a lower ignition voltage (starting voltage) than the second lamps. The lamps having lower operating voltage drops are intended for use in countries where the public electric network is operated at a voltage of 110 V or 120 V and in the arrangements supplied with electric power from such networks it is very simple to ensure the stable operating point of the high-pressure discharge lamp: it is sufficient to use a single inductive member (choke) together with the lamp. In areas where the supply voltage ensured by the public network is over 200 V the lamps having a lower operating voltage drop can not be simply applied because the supplying arrangements with a 220 V or higher voltage, a single inductive element is not sufficient for overcoming the risks to the high-pressure discharge lamps following from the higher voltage level. The basic problem is linked with the fact that for diminishing the voltage to the value required by the lamp having a lower operating voltage drop the inductive elements should be completed by adding further special circuit elements, as a transformer or other voltage diminishing converters. The mentioned elements are expensive, they make the costs of production increase and in addition they result in decreasing the efficiency of the lighting system consisting of the lamp and the circuit for igniting and lighting it. It is true, the sophisticated circuit arrangement can ensure the long life duration of the lamp but this advantage can be reached only by costs considered to be too high.

Taking into account the above mentioned requirements it should be noted that the voltage limits are present also in the case of high-frequency lighting systems of 220 V supply voltage. When rectifying the alternating current of 220 V the direct voltage is limited and this is a limitation also for the alternating voltage which can be generated on the basis of the rectified voltage in an appropriate converter comprising switch generators. Applying two in series connected with semiconductor switching elements in a pulse generator for generating square pulses with level about 80% of the network voltage and controlling them in push-pull arrangement it is practically impossible to realize a circuit system on the basis of the known solutions which can be economically applied for controlling the high-pressure discharge lamps having a low operating voltage drop.

Another group of requirements considered to be met by the circuit systems for igniting and lighting high-pressure discharge lamps is linked with the generating of the ignition pulses. During the ignition of the discharge lamp the ignition pulse should be generated with a high reliability and the pulses should have a high voltage level. The commonly used high-pressure discharge lamps require ignition pulses in the range from 1000 to 2000 V and some of their special types higher yet in range up to 4000 V. The high voltage values are usually realised on resonance principle by oscillating the voltage pulse. Therefore the circuit systems should be realised on the basis of elements which are able to withstand the high voltage load without negative effects. This requirement results in difficulties during designing the circuit systems especially when some other limits (of the dimensions, weight etc.) should be taken into account. The circuit systems prepared for these high ignition voltage values are extended and heavy. The ignition realized on the basis of voltage oscillations requires the use of semiconductor elements which should be protected very effectively from the high voltage of the ignition.

The West-German Pat. specification laid-open under the No. 27 05 170 shows a circuit arragement the ignition and lighting of a high-pressure discharge lamp supplied with power from a battery or an other direct current source. The circuit system shown in the specification German Pat. No. 27 05 170 comprises a pulse generator connected to a terminal of a condenser being in a parallel connection with the high-pressure discharge lamp over an inductive member and advantageously directly to the other terminal thereof. This pulse generator constitutes an AC/DC-converter producing high-frequency signals and comprises two semiconductor switch circuit elements and a voltage divider built-up from resistors. The resistors and the semiconductor switch circuits are connected to a pulse transformer which is the basis of the pulse generator. The main disadvantage of this solution is that the high-voltage ignition pulses are generated as single pulses and therefore the electric elements of the entire circuit system should be prepared as to withstand the high voltage required by the lamp during ignition. This means a very extensive electric load of the circuit elements.

SUMMARY OF THE INVENTION

The invention is directed to creating a circuit system, which is applicable—as the known solutions—for igniting and lighting a high-pressure discharge lamp and in comparison the known systems can work with essentially a lower voltage drop of ignition requiring thereby circuit elements of much lower electric strength and which further ensures the possibility of operating high-pressure discharge lamps having a low operating voltage drop from a network of higher voltage without deteriorating the efficiency and the reliability of the operation.

The invention is based on the recognition that the known circuit arrangements, as they are shown e.g. in the mentioned West-German laid-open publication No. 27 05 170 can be essentially improved by completing them by a transformer, i.e. an auxiliary pulse transformer for producing ignition pulses to be added to the basic pulses generated by the basic circuit system and/or a coupling transformer.

Hence, the invention is a circuit system for lighting a high-pressure discharge lamp, particularly a sodium vapour lamp, comprising a pulse generator for generating signals of at least 1 kHz frequency being a high-frequency DC/AC inverter connected to a direct current source. An ignition circuit coupled to the pulse generator including a high-pressure discharge lamp, a condenser connected in parallel with the high-pressure discharge lamp and an inductive member connected to the condenser and the high-pressure discharge lamp and forming a series member with the condenser. Wherein the ignition circuit comprises a transformer having a secondary winding connected in series with the inductive member.

The circuit system according to the invention preferably comprises a pulse generator which is a blocking-oscillator connected to the direct voltage output of an AC/DC converter coupled with an alternating current network, the blocking oscillator being selfcontrolled and of a frequency depending on the load, comprising a pulse transformer and two semiconductor switch circuit elements, connected to a voltage divider. When the voltage divider consists of resistors and is coupled in parallel to a capacitive voltage divider consisting of condensers and middle point of which is connected to the primary winding of the pulse transformer. The capacitive voltage divider ensures dividing the supply voltage into two equal parts.

The pulse generator of the proposed circuit system is preferably equipped with at least one blocking condenser arranged in series with the primary winding of the pulse transformer for blocking direct current components.

In the operating of the circuit system of the invention it is especially advantageous when the inductive member and the condenser constitute a resonance circuit tuned to the no-load frequency of the pulse generator.

A group of the known circuit arragements for igniting and lighting high-pressure discharge lamps operates on the basis of oscillating the usually square output voltage pulses of a pulse generator. According to the invention it is very important that an additive voltage is generated and superimposed onto the square pulse in a way which can not be harmful for the circuit elements of the proposed circuit system as it will be shown later. The circuit system comprises for generating the additive voltage an auxiliary pulse transformer with the primary winding connected to a separated auxiliary pulse generator for generating additive ignition pulses and the secondary winding is arranged in the ignition circuit between the condenser and the high-pressure discharge lamp.

In an advantageous embodiment of the proposed circuit system the auxiliary pulse generator comprises a condenser charged by the supply voltage of the pulse generator preferably over a resistor, a voltage divider connected in parallel to the charged condenser and a thyristor connected to the middle point of the voltage divider and to the primary winding of the auxiliary pulse transformer.

For igniting and lighting high-pressure discharge lamps characterized by the operating voltage drop being much lower than the usual higher values of the public network voltage it is possible to ensure high reliability and high efficiency of the work if in the proposed circuit system of the invention the pulse generator is connected to a direct current source of at least 150 V voltage supplying direct current to the pulse generator coupled with a high-pressure discharge lamp of operating voltage drop being at most 35% of the direct current voltage. Also the inductive member is in series with a secondary winding of a coupling transformer for diminishing voltage, the primary winding of which is connected to the pulse generator, wherein the pulse generator comprises semiconductor switch elements working under push-pull control and produces pulses with frequency at least 1 kHz. In the ignition circuit, as mentioned, a condenser is in series connected with the inductive member and the high-pressure discharge lamp. The secondary winding of the coupling transformer is connected in parallel to the high-pressure discharge lamp.

In an advantageous embodiment of the proposed circuit system the condenser is coupled in parallel to the high-pressure discharge lamp and the inductive member is connected to the secondary winding of the auxiliary pulse transformer and/or the coupling transformer form a resonance circuit tuned to the no-load frequency of the pulse generator. In the condenser of the resonance circuit arranged in parallel to the high-pressure discharge tube transient voltage of a high level can be produced which per se or together with auxiliary ignition pulses generated by an ignition circuit comprising the primary winding of the auxiliary pulse transformer make ignition of the high-pressure discharge lamp easier.

A part of the circuit elements applied in the proposed and known circuit systems can be saved if the pulse transformer of the pulse generator is equipped with an intermediary tap point in its primary winding, and an output of the primary winding made between the end of the winding and the intermediary tap point constitutes an output of the coupling transformer. In this embodiment the pulse transformer is the coupling transformer of the proposed circuit system. The last mentioned transformer can be excluded from the circuit system with a group of high-pressure discharge lamps of lower operating voltage drop.

The proposed circuit arrangement can be further simplified in the case of high-pressure discharge lamps having a low operating voltage drop by using an auto-transformer as the pulse transformer with an intermediary tap point coupled directly or through a choke of reduced inductance with the condenser wherein the inductance of the resonant circuit is at least partly supplied by the leakage inductance of the pulse transformer.

The reliability of the ignition of several types of high-pressure discharge lamps having a high power demand can be further improved, if the secondary winding of the auxiliary pulse transformer is arranged between the condenser and the electrode of the high-pressure discharge lamp, wherein, as mentioned, its primary winding is connected to the output of an auxiliary pulse generator.

In another embodiment of the proposed circuit system the output of the pulse generator is connected with the primary winding of the coupling transformer. The secondary winding of this transformer is connected to the condenser through a choke, wherein between the condenser and one electrode of the high-pressure discharge lamp the secondary winding of the auxiliary pulse transformer is arranged, and the primary winding of the last is supplied from the auxiliary pulse generator.

In the period of preheating, the discharge tubes act as a rectifier and this can result in non-desired premagnetization which should be avoided. In order to ensure this in an advantageous embodiment of the circuit system according to invention, at least one terminal of the primary winding of the pulse transformer is connected in series with a blocking condenser, for separating the direct current components.

The proposed circuit system satisfies the set objects. This means the circuit system as proposed realizes the conditions of igniting and lighting high-pressure discharge lamps having a lower operating voltage drop from networks of relatively higher voltage and, it is simple, if shows low level of electric losses, i.e. high level of efficiency and, by the use of the resonance circuit, the ignition process, and the electric safety of the circuit system are improved and, the inductive elements, the chokes are exposed to relatively low electric load.

The invention will be further described with reference to the attached drawings showing by way of example some preferred embodiments of the circuit system of the invention.

DETAILED DESCRIPTION OF PREFERRED EXEMPLARY EMBODIMENTS AND MODES OF THE INVENTION

The proposed circuit system serves for igniting and lighting high-pressure discharge lamps, particularly sodium vapour lamps, i.e. for supplying voltage of a required level to the discharge lamps in order to ensure the conditions of their ignition and lighting.

Figure 1:
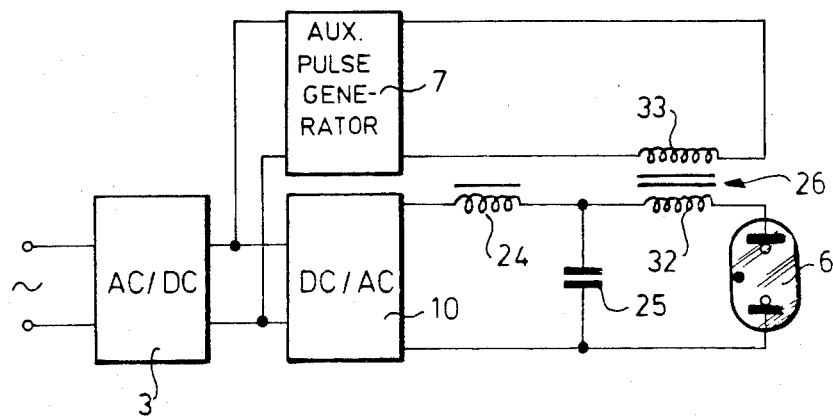
FIG. 1 is the block diagram of a basic embodiment of the proposed circuit system.
Figure 2:
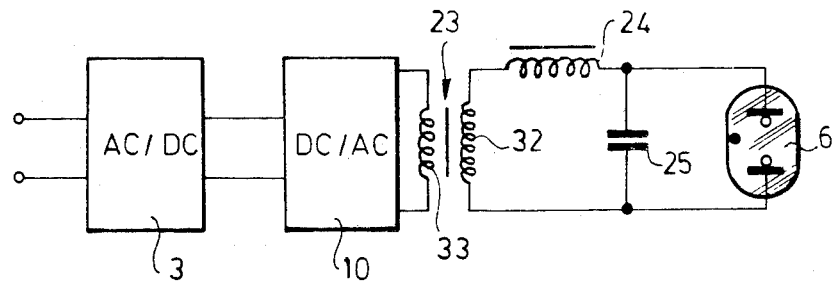
FIG. 2 is the block diagram of another basic embodiment of the proposed circuit system.

The very essential feature of the proposed circuit system is the application of an appropriate transformer in a circuit based on the known solutions and elements as shown in FIGS. 1 and 2.

In the circuit system of the invention, an AC/DC converter 3 producing direct current from alternating current is connected to terminals 1 and 2 forwarding alternating current particularly from a public network. Of course, the circuit system can be connected to any appropriate direct current source, if required. The AC/DC converter 3 can be e.g. a Graetz rectifier (full-wave rectifier).

The outputs of the AC/DC converter 3 are connected through terminals 4 and 5 to a DC/AC inverter, particularly a pulse generator 10, the outputs 20 and 21 of which forward square pulses of required frequency lying generally over 1 kHz. The pulse generator 10 is coupled directly (FIG. 1) or through a coupling transformer 23 for diminishing the transmitted voltage, i.e. through a separation or isolating unit with an ignition circuit (FIG. 2). In the case of direct connection the ignition circuit comprises an inductive member 24 coupled by its one terminal with the output 20 of the pulse generator 10. The output 21 of the pulse generator 10 is connected to the other terminal of the inductive member 24 through a condenser 25. Advantageously, the inductive member 24 and the condenser 25 constitute a resonance circuit tuned to the no-load frequency of the pulse generator. In parallel to the condenser 25 a high-pressure discharge lamp 6 is arranged. As shown in FIG. 1 the condenser 25 can be connected through a secondary winding 32 of an auxiliary pulse transformer 26 to a terminal (electrode) of the high-pressure discharge lamp 6. The inductive member 24 and the secondary winding 32 constitute in this case a series member and the primary winding 33 of the auxiliary pulse transformer 26 is connected with the outputs of an auxiliary pulse generator 7 producing appropriate ignition pulses, if required.

Another embodiment is shown in FIG. 2. In this basic embodiment a coupling transformer 23 ensures the ignition and lighting conditions of the high-pressure discharge lamp 6. This solution is especially advantageous when applying a relatively high voltage public network for supplying current to a high-pressure discharge lamp 6 having a relatively low operating voltage drop lying in the range e.g. 50 V. The primary winding 33 of the coupling transformer 23 is connected to the outputs 20, 21 of the pulse generator 10, and the secondary winding 32 thereof is connected through its one terminal to the inductive member 24 and through its other terminal to the condenser 25. The secondary winding 32 is arranged in parallel to the high-pressure discharge lamp 6.

Figure 4:
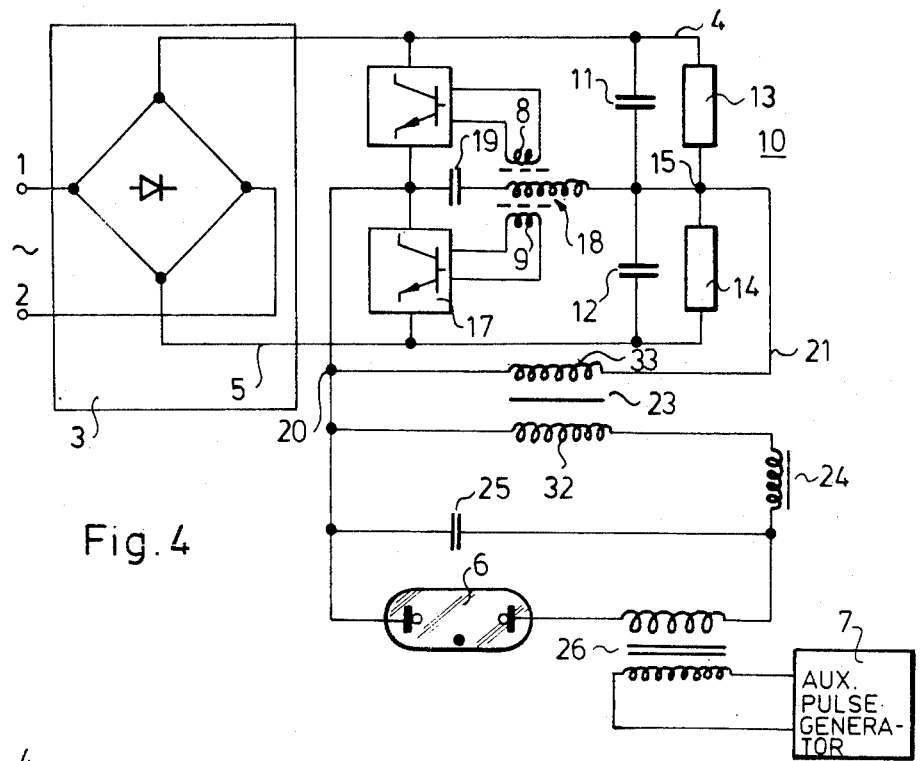
FIG. 4 is the circuit diagram of the basic embodiment shown in FIG. 2, completed with an auxiliary pulse generator.

The auxiliary pulse transformer 26 together with the coupling transformer 23 for diminishing the voltage can be applied in a more sophisticated circuit system, shown in FIG. 4 corresponding to the basic embodiment of FIG. 2.

It can be seen from the FIGS. 3, 4, 5, 6 and 7 that the input terminals 4, 5 of the pulse generator 10 are connected to condensers 11 and 12. In parallel to the condensers 11 and 12 resistors 13 and 14 are arranged. The first form a capacitive and the second a normal voltage divider while middle point 15 being a virtual middle point of the proposed circuit system. Between the middle point 15 and the input terminals 4 and 5 there are push-pull controlled semiconductor type switch elements 16, 17 comprising transistors T1 and T2. The pulse generator 10 includes a pulse transformer 18 having a primary winding 22. The pulse transformer 18 should bring about an antiphase feedback of the semiconductor switch elements 16, 17. The primary winding 22 of the pulse transformer 18 is connected with the middle point 15 through a blocking condenser 19 closing the current path for the direct current components and with a common point of the semiconductor switch elements 16, 17. This common point constitutes an output 20 of the pulse generator 10.

Figure 7:
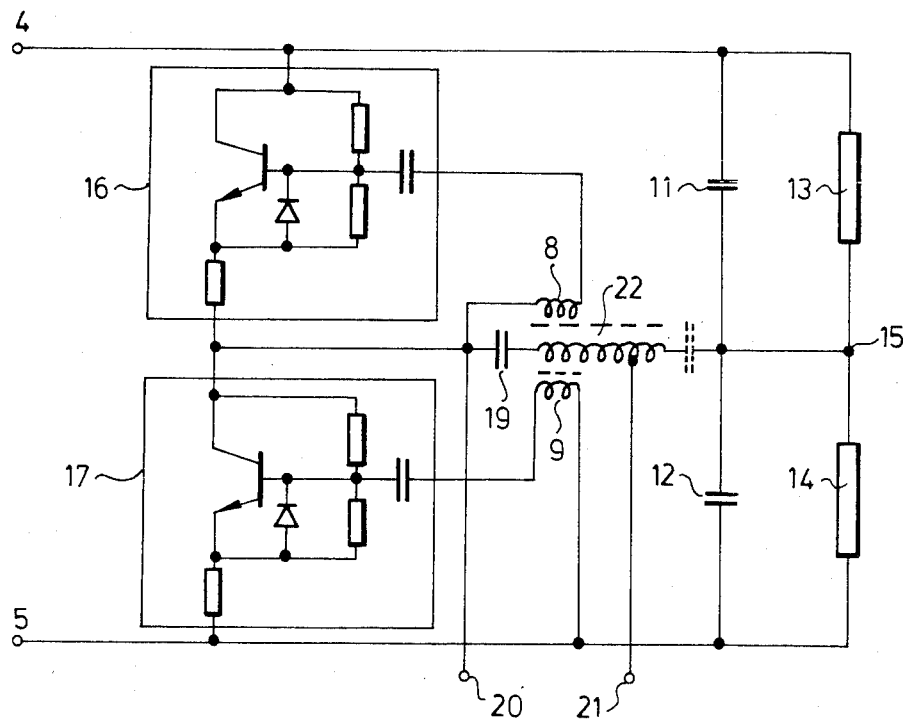
FIG. 7 is an example of the pulse generator 10 shown in FIGS. 3 to 6.

The pulse transformer 18 is provided with secondary windings 8 and 9 connected to the semiconductor switch elements 16, 17 for producing the antiphase feedback. The most advantageous embodiment of the pulse generator 10 can be seen in the form of a blocking oscillator. A circuit diagram of a blocking oscillator is shown in FIG. 7. The semiconductor switch elements 16, 17 are made-up from well-known circuit elements, therefore the drawing and the specification requires no further comments on them.

Referring now to the FIGS. 2 and 4 it is important to note, that between the outputs 20 and 21 the primary winding of the coupling transformer 23 is connected, while, the inductive member 24 connected to the secondary winding of the coupling transformer is a choke. The other terminal of the choke is connected to the common point of the condenser 25 and the secondary winding 32 of the auxiliary pulse transformer 26 supplying current to the high-pressure discharge lamp 6. The auxiliary pulse generator 7 is coupled, as mentioned, with the secondary winding of the auxiliary pulse transformer 26.

Figure 5:
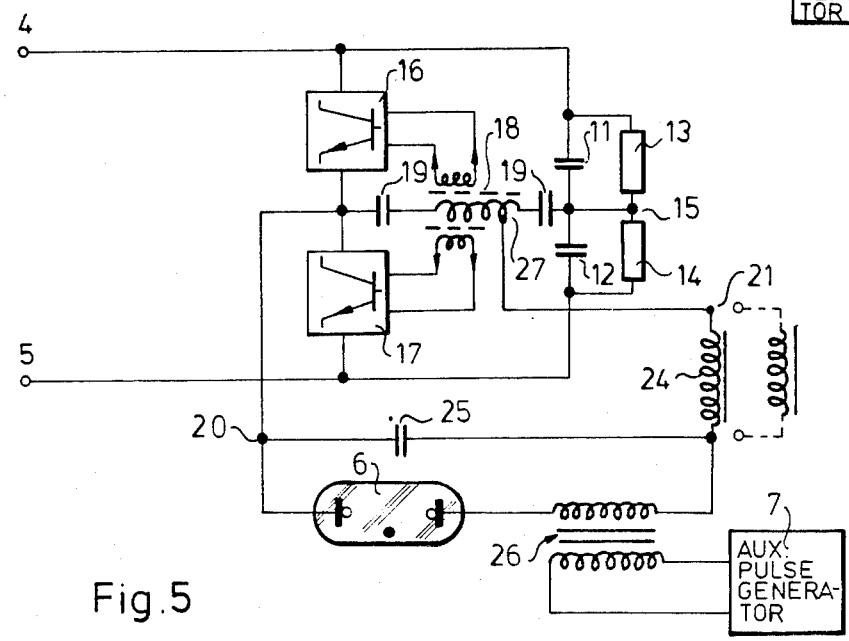
FIG. 5 is another embodiment of the circuit system of the invention based on the embodiment shown in FIG. 4.

The basic embodiment shown in FIG. 2 together with circuit diagram according to the FIG. 4 can be improved in a way as shown in FIG. 5, wherein the pulse transformer 18 comprises an intermediary tap point 27 determining the output 21 of the pulse generator 10. Because of using an autotransformer as the pulse transformer 18, it is possible to omit the coupling transformer 23 shown in FIGS. 2 and 4: the coupling of required level can be ensured by the appropriate intermediary tap point 27. By selecting dimensions according to the requirements and by using an autotransformer for pulse transformer 18, the compact inductive member 24 is not necessary, i.e. the choke can be omitted, because the series leakage inductance of the circuit is able to ensure the necessary resonance conditions. This is shown in FIG. 5 by dash line. One of the basic requirements of the highly reliable work of the proposed circuit system is that the condenser 25 and the corresponding inductive member 24, i.e. the choke representing the real compact inductance or the transformed leakage inductance transformed in the no-load state of the pulse generator 10, i.e. in non-ignited state of the high-pressure discharge lamp it forms a resonance circuit.

Figure 6:
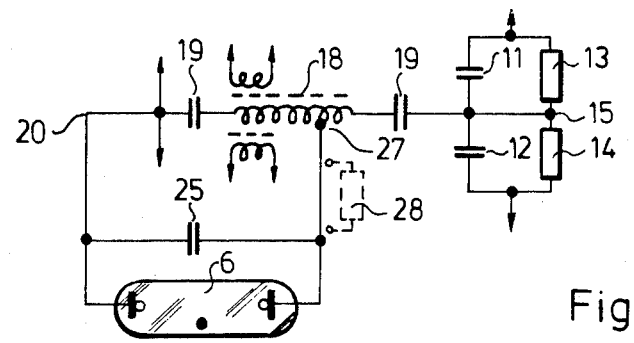
FIG. 6 is a detail of another advantageous embodiment of the proposed circuit system.

In FIG. 6 a further embodiment of the circuit system shown in FIG. 5 can be seen. In this drawing the auxiliary pulse transformer 26 and the auxiliary pulse generator 7 for producing additive ignition voltage pulses are not shown. A dash line represents a series reactance with which the condenser 25 can form the resonance circuit in the no-load state of the pulse generator 10. The circuit parts not shown in FIG. 6 are the same as those shown in FIGS. 3, 4 and 5.

Figure 3:
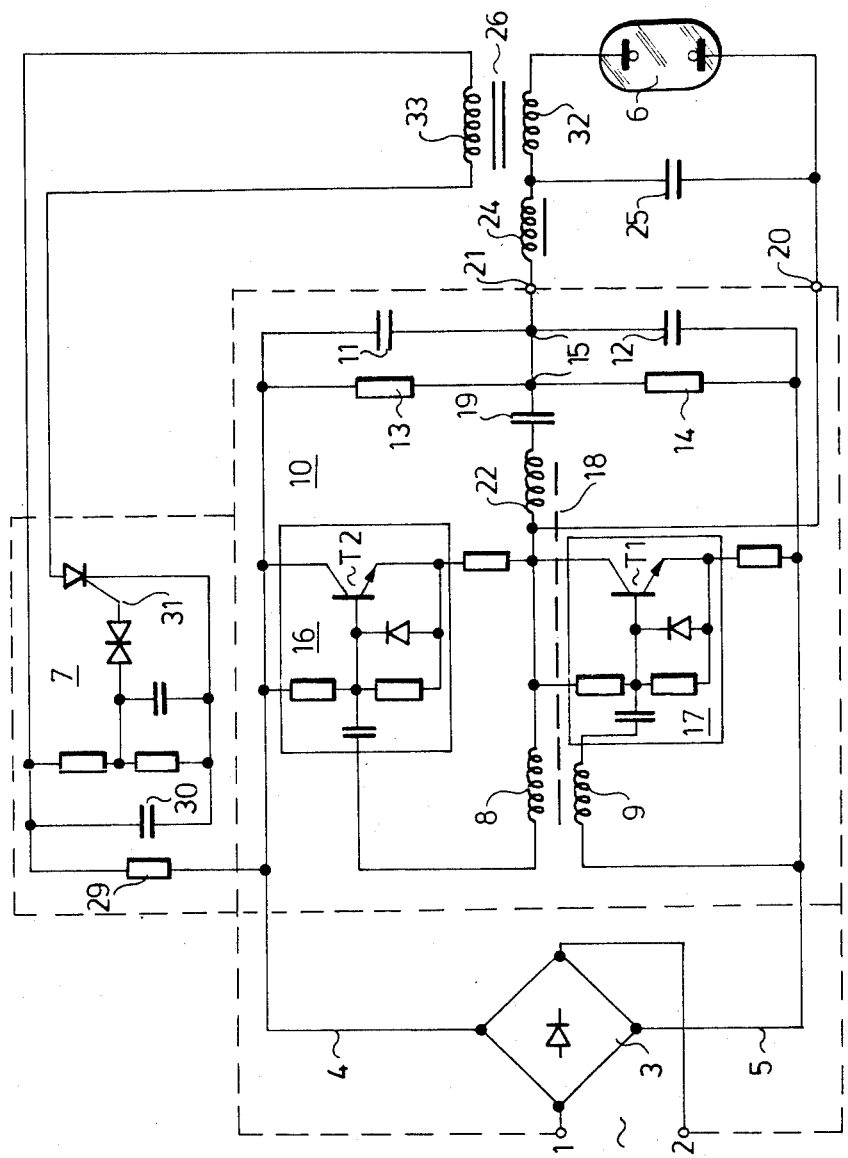
FIG. 3 is the circuit diagram of the basic embodiment shown in FIG. 1.

As it can be seen from FIG. 3 the auxiliary pulse generator 7 comprises a condenser 30 charged by the inputted direct voltage of the pulse generator 10 advantageously through a resistor 29 and a thyristor 31 and a switch element, e.g. a diac for charging out the condenser 30. The ignition circuit of the thyristor 31 includes also a voltage divider arranged in parallel to the condenser 30.

When using the embodiment shown in FIGS. 1 and 3, the pulse generator 10 formed as a blocking oscillator acts as usual and this is per se well known, it requires no further comments. In its no-load state the pulse generator 10 generates output signals with oscillating voltage level and to this level the ignition pulses generated by the auxiliary pulse generator 7 are added. The resulting high level pulses can ensure the ignition of the high-pressure discharge lamp. This is carried out in the following way: the voltage on the condenser 30 is increasing while being charged through the resistor 29 up to a value determined by the ignition circuit of the thyristor 31. After reaching the required voltage level the thyristor is fired and it discharges the condenser 30. In this way a current pulse is generated which induces a high voltage pulse in the secondary winding of the auxiliary pulse transformer 26 and this voltage pulse results together with the basic pulse in the ignition of the high-pressure discharge lamp.

The circuit diagrams shown in FIGS. 2, 4, 5, 6 and 7 illustrate circuit system operating as follows:

After rectifying the full wave of the network voltage present between the terminals 1 and 2, a voltage of e.g. 200 V the rectifier passes a direct voltage with a level amounting to 80 to 90% of the peak voltage, on the condition that a storage condenser of appropriate capacity is used. The rectifying unit should comprise also filtering means not shown in the drawings. In a rectifier of appropriate construction the direct voltage between the terminals 4 and 5 can reach 200 V and on the common point 15 half of this value is present. The half voltage is led to the semiconductor switch elements 16 and 17 of the pulse generator 10, and the switch elements ensuring antiphase feedback can be opened and closed in an avalanche fashion. The primary winding 22 of the pulse transformer 18 receives in this case square pulses of peak value 150 V. By building up symmetrical branches in the pulse generator 10 the duty factor characterizing the series of the pulses is 0.5 which means a symmetric alteration of the square pulses. The condenser 19 ensures the blocking of the direct current components and this is especially important in the case of embodiments shown in FIGS. 5 and 6.

The frequency of the pulses is advantageously in the range from 10 to 30 kHz and the higher values appear—when the pulse generator 10 corresponds to that of FIG. 7—, at higher loads.

Figure 8:
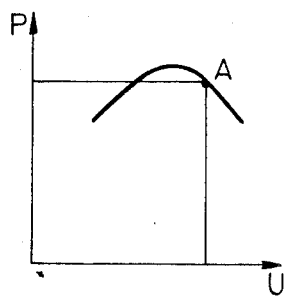
FIG. 8 is a part of the typical operating voltage drop-power characteristics of the high-pressure discharge lamps.

The circuit system as shown in the attached drawings has the main object to ensure the working conditions of a high-pressure discharge lamp 6 having a low operating voltage drop in order to realise igniting and lighting the lamp with high reliability. Taking into account a supply network voltage 220 V the high-pressure sodium vapour lamps having a 45 to 75 V operating voltage drop, i.e. amounting 20 to 35% of the supply voltage, the life duration of the lamps can be longer than that of the discharge lamps having an operating voltage drop of 90 to 110 V and which are usually connected to networks of 220 V. The lower operating voltage drop of a discharge lamp can be ensured by shortening the lamp, by selecting a shorter discharge tube. During the life of the lamp the operating voltage drop is slowly increasing. This requires applying, in order to ensure the stability of the operation, a series reactive element the reactance of which together with the voltage is capable of adjusting a working point A (FIG. 8) lying higher than the peak point of the power-voltage-characteristics shown in FIG. 8. It is well known that in the characteristics as shown in FIG. 8 the maximum power taken by the lamp can be observed at the half value of the supply voltage. In the case having a discharge lamps of lower operating voltage drop it is necessary to apply an increased series inductance and therefore this requirement of selecting the operating voltage drop can not be met. This means that in order to ensure the best operating point of the discharge lamp it is necessary to use a supply source with a voltage lower than the level of the square voltage pulses which can be obtained at the primary winding 22 of the pulse transformer 18.

In the solution shown in FIG. 4 the reduction of the voltage is carried out by the coupling transformer 23. The secondary winding of this transformer together with a choke acting as the reactive member 24 and the secondary winding of the auxiliary pulse transformer 26 form a series reactive member, through which the high-pressure discharge lamp 6 can be fed by a supply voltage. The condenser 25 is very important in the ignition process of the discharge lamp. The best choice is to apply a condenser 25 constituting together with the choke (inductive member 24) a resonant circuit at a frequency characterizing the no-load state of the pulse generator, because in this case the pulse generator 10 generates transient ripple voltage on this condenser according to the quality factor (Q-factor) thereof and this is the base voltage superimposed by the pulses generated by the auxiliary pulse generator 7. From this process follows that the operating voltage drop can be low after ignition of the lamp, the output voltage of the auxiliary pulse generator 7 can be low, and this results in a low electrical load for the choke 24 and for the auxiliary pulse transformer 26, as well. After ignition the lamp constitutes a load tuning the resonance circuit away from resonance conditions and it creates an increasing load, whereby the voltage can not be increased. The lamp current flows over the secondary winding of the auxiliary pulse transformer 26 which acts in such conditions as a series choke. Taking into account the ignition pulses the auxiliary pulse transformer 26 is highly loaded because the operating discharge tube is connected to the circuit, and it by-passes the outputs of the transformer through the condenser 25.

In the embodiment shown in FIG. 4 in comparison to the circuit systems supplied directly from a network it is ensured that the advantages offered by the invention are present over known advantages of high-frequency supply, i.e. the increase of the efficiency and absence of the stroboscopic effects. The advantages seem to be obvious, and they can be made greater if the conditions are appropriate and the coupling transformer 23 can be omitted. This transformer causes increasing dimensions for the system and the use of it is coupled with losses which can not be avoided any way and this results in decreasing efficiency for a system comprising the coupling transformer 23.

In the solution represented by the circuit diagram of FIG. 5 it is possible to avoid the coupling transformer 23 because of using the intermediary tap point 27 what results in turning the pulse transformer 18 into an autotransformer which is capable of supplying the high-pressure discharge lamp a pulsed voltage of reduced level which is necessary during operation the lamp. The position of the intermediary tap point 27 can be determined in dependency on the nominal operating voltage drop of the high-pressure discharge lamp. In the circuit diagram of the FIG. 5 the condenser 19 makes the circuit diagram independent from the direct current circuit parts arranged between the input terminals 4 and 5.

An advantageous embodiment of the pulse transformer 18 makes it possible to decrease the inductance of the choke (the inductive member 24) and in some cases to avoid it. In the last case the pulse transformer 18 should be an autotransformer wherein the leakage inductance measurable from the side of the intermediary tap point 27 and the condenser 25 form together a resonance circuit. The solution as shown in FIG. 6 is especially advantageous for supplying power to high-pressure discharge lamps of low power, because of their need for a low operating voltage drop. This fact make it possible that neither the auxiliary pulse transformer 26 nor the auxiliary pulse generator 7 is necessary. In this arrangement it is also important that the resonance circuit built-up with the leakage inductance is characterized by a higher quality factor than that having a compact inductance and therefore the condenser 25 is capable of generating ignition pulses of increased voltage level.

In the embodiments of circuit diagram shown in the FIGS. 5 and 6 it is especially advantageous that they are built up from circuit elements being present in a small number. This results in an important reduction of the manufacturing costs and of the dimensions of the circuit system proposed by the invention and contributes to the reduction of the electric losses of the entire circuit system. The high-frequency pulse transformer 18 can be characterized by small dimensions which is also advantageous.

A further advantage of the proposed circuit diagram should be seen, as mentioned above, in the fact that the electric load of the circuit elements and the required electric strength thereof must not be too high, the semiconductor switch elements 16 and 17 are completely separated from the supply voltage and their direct current load is only half of the load following from the entire value of the direct voltage. Thereby it is possible to reduce the dimensions of the proposed circuit system, which results also in reduced manufacturing costs.

The main advantage of the proposed circuit system should be seen in ensuring the conditions of supplying high-pressure discharge lamps having a low operating voltage drop from networks of higher voltage ensuring thereby their higher life duration and more reliable operation and in reducing the electric load on the circuit elements.

The embodiments shown above relate to high-pressure discharge lamps connected to an alternating voltage network, however the proposed circuit system is capable of operating also in the case when the terminals 4 and 5 are connected directly to a direct current source of required voltage level. The application of the proposed circuit system is especially advantageous when the nominal value of the operating voltage drop of the high-pressure discharge lamp is not higher than 35% of the direct current voltage used for supply.

Although the invention has been described above with reference to specific example embodiments especially of the pulse generators 7 and 10, it will be appreciated that it is intended to cover all modifications and equivalents within the scope of the appended claims.

What we claim is:

1. A circuit system for igniting and operating a high-pressure discharge lamp, particularly a sodium vapor lamp, comprising a pulse generator for generating signals of at least 1 kHz frequency being a high-frequency DC/AC inverter connected to a direct current source and an ignition circuit coupled to said pulse generator including a high-pressure discharge lamp, a condenser connected in parallel with said high-pressure discharge lamp and an inductive member connected to said condenser and said high-pressure discharge lamp and forming a series member with said condenser, wherein said ignition circuit comprises a transformer having a secondary winding connected in series with said inductive member, wherein said transformer is an auxiliary pulse transformer comprising a primary winding connected to an auxiliary pulse generator for generating auxiliary ignition pulses to be added to the pulses of said ignition circuit and a secondary winding of said auxiliary pulse transformer is arranged between said condenser and said high-pressure discharge lamp, wherein said inductive member and said condenser constitute a resonance circuit tuned to the no-load frequency of said pulse generator.

2. A circuit system as claimed in claim 1, wherein said pulse generator is connected to a direct current source of at least 150 V supplying direct current to said pulse generator coupled to a high-pressure discharge lamp having an operating voltage drop being at most 35% of the direct current voltage of said source and said inductive member is a leakage inductance of a pulse transformer having an intermediary tap point, said pulse transformer being arranged in the pulse generator.

3. A circuit system as claimed in claim 1, comprising a direct current source in the form of an AC/DC converter.

4. A circuit system as claimed in claim 1, wherein said pulse generator is connected to a direct current source of at least 150 V supplying direct current to said pulse generator coupled to a high-pressure discharge lamp having an operating voltage drop being at most 35% of the direct current voltage of said source and said transformer is a coupling transformer for reducing the voltage and having a primary winding connected to said pulse generator and a secondary winding arranged in parallel with the high-pressure discharge lamp.

5. A circuit system as claimed in claim 1, wherein said auxiliary pulse generator comprises a condenser charged by the supply voltage of said pulse generator, a voltage divider connected in parallel with said condenser and a thyristor connected to the middle point of said voltage divider and to said primary winding of said auxiliary pulse transformer.

6. A circuit system as claimed in claim 1, wherein said pulse generator is a blocking-oscillator connected across the direct voltage output of an AC/DC converter connected with an alternating current network, said blocking oscillator being self controlled and having a frequency depending on the load, comprising a pulse transformer and two semiconductor switch circuit elements connected to a voltage divider consisting of resistors.

7. A circuit system as claimed in claim 1, wherein the pulse generator comprises in parallel with said voltage divider resistors a capacitive voltage divider consisting of condensers for dividing the supply voltage into two equal parts, the middle point of which is connected to the primary winding of said pulse transformer.

8. A circuit system as claimed in claim 1, wherein a blocking condenser is arranged in series with the primary winding of a pulse transformer in the pulse generator.

9. A circuit system for igniting and operating a high-pressure discharge lamp, particularly a sodium vapor lamp, comprising a pulse generator for generating signals of at least 1 kHz frequency and forming a high-frequency DC/AC inverter connected to a direct current source, and an ignition circuit coupled with said pulse generator including a high-pressure discharge lamp, a condenser connected in parallel to said high-pressure discharge lamp and an inductive member connected to said condenser and said high-pressure discharge lamp and forming a series member with said condenser, wherein said ignition circuit comprises an auxiliary pulse transformer for generating auxiliary ignition pulses to be added to the pulses generated by the ignition circuit, said auxiliary pulse transformer having a secondary winding coupled between said condenser and said high-pressure discharge lamp and connected in series with said inductive member and a primary winding connected to an auxiliary pulse generator for generating ignition pulses, wherein said pulse generator is connected to a direct current source of at least 150 V supplying direct current to said pulse generator coupled to a high-pressure discharge lamp of operating voltage drop being at most 35% of the direct current voltage of said source and said inductive member is a leakage inductance of a pulse transformer having an intermediary tap point, wherein the pulse transformer is arranged in the pulse generator.

10. A circuit system as claimed in claim 9, wherein said auxiliary pulse generator comprises a condenser connected for charging by the output voltage of said pulse generator over a resistor, a voltage divider connected in parallel to said connecting for charging condenser and a thyristor connected to the middle point of said voltage divider and to said primary winding of said auxiliary pulse transformer.

11. A circuit system as claimed in claim 9, wherein said pulse generator is a blocking-oscillator connected to the direct voltage output of an AC/DC converter connected with an alternating current network, said blocking oscillator being self controlled and having a frequency depending on load, comprising a pulse transformer and two semiconductor switch circuit elements, connected to a voltage divider consisting of resistors and to a capacitive voltage divider consisting of condensers arranged in parallel to the voltage divider consisting of resistors, wherein the middle point of said dividers is connected to the primary winding of said pulse transformer.

12. A circuit system as claimed in claim 9, wherein a blocking condenser is arranged in series with the primary winding of said pulse transformer.

13. A circuit system as claimed in claim 9, wherein said inductive member and said condenser constitute a resonance circuit tuned to the no-load frequency of said pulse generator.

14. A circuit system for supplying a high-pressure discharge lamp requiring high-frequency supply, particularly a sodium-vapor lamp during lighting and operating, comprising
  (a) a pulse generator for generating high-frequency pulses of at least 1 kHz frequency,
  (b) an auxiliary pulse generator for generating auxiliary pulses
  (c) a pulse transformer,
  (d) a first circuit coupled to the output of said auxiliary pulse generator and including the primary winding of said pulse transformer, and
  (e) a second circuit coupled to the output of said pulse generator including a high pressure discharge lamp, and inductive member introduced between the output of said pulse generator and input means of said high-pressure discharge lamp, a condenser connected in parallel with said high-pressure discharge lamp forming a high-impedance member at frequency of operating said high-pressure discharge lamp and constituting in lighting conditions with said inductive member series oscillator means for generating pulses of increased voltage, and a winding being the secondary winding of said pulse transformer for receiving, adding together and forwarding said pulses of increased voltage and said auxiliary pulses, forming together with said inductive member a high-frequency inductive ballast means during operating said high-pressure discharge lamp.

15. A circuit as claimed in claim 14, wherein said pulse generator is a high-frequency DC/AC inverter connected to a direct current source.

16. A circuit system as claimed in claim 15, wherein said pulse generator is connected to a direct current source of at least 150 V supplying direct current to said pulse generator coupled to a high-pressure discharge lamp having an operating voltage drop being at most 35% of the direct current voltage of said source and said inductive member is a leakage inductance of a pulse transformer having an intermediary tap point, said pulse transformer being arranged in the pulse generator.

17. A circuit system as claimed in claim 15, wherein said auxiliary pulse generator comprises a condenser charged by the supply voltage of said pulse generator, a voltage divider connected in parallel with said condenser and a thyristor connected to the middle point of said voltage divider and to said primary winding of said auxiliary pulse transformer.

18. A circuit system as claimed in claim 14, wherein said pulse generator is a blocking-oscillator connected across the direct voltage output of an AC/DC converter connected with an alternating current network, said blocking oscillator being self-controlled and having a frequency depending on the load, comprising a pulse transformer and two semiconductor switch circuit elements connected to a voltage divider consisting of resistors.

19. A circuit system as claimed in claim 17, wherein the pulse generator comprises in parallel with said voltage divider resistors a capacitive voltage divider consisting of condensers for dividing the supply voltage into two equal parts, the middle point of which is connected to the primary winding of said pulse transformer.

20. A circuit system as claimed in claim 15, wherein a blocking condenser is arranged in series with the primary winding of a pulse transformer in the pulse generator.

* * * * *